(12) United States Patent
Annamalai et al.

(10) Patent No.: US 11,010,410 B1
(45) Date of Patent: May 18, 2021

(54) PROCESSING DATA GROUPINGS BELONGING TO DATA GROUPING CONTAINERS

(71) Applicant: Facebook, Inc., Menlo Park, CA (US)

(72) Inventors: Muthukaruppan Annamalai, Redmond, WA (US); Kaushik Ravichandran, Foster City, CA (US); Igor A. Zinkovsky, Redmond, WA (US); Harish Srinivas, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 152 days.

(21) Appl. No.: 16/159,192

(22) Filed: Oct. 12, 2018

(51) Int. Cl.
*G06F 7/00* (2006.01)
*G06F 16/00* (2019.01)
*G06F 16/28* (2019.01)

(52) U.S. Cl.
CPC .................... *G06F 16/285* (2019.01)

(58) Field of Classification Search
None
See application file for complete search history.

(56) References Cited

U.S. PATENT DOCUMENTS

| | | | | |
|---|---|---|---|---|
| 8,768,984 B2 * | 7/2014 | Priddle | ............. | H04N 21/4332 707/827 |
| 2013/0191610 A1 * | 7/2013 | Burka | ................. | G06F 12/122 711/206 |
| 2014/0032525 A1 * | 1/2014 | Merriman | .......... | G06F 16/2453 707/713 |
| 2014/0122783 A1 * | 5/2014 | Oh | ........................ | G06F 3/0647 711/103 |
| 2015/0326656 A1 * | 11/2015 | Guo | .................... | H04L 67/1008 709/226 |
| 2015/0356125 A1 * | 12/2015 | Golander | ............. | G06F 16/219 707/620 |
| 2016/0154601 A1 * | 6/2016 | Chen | .................... | G06F 3/0647 711/111 |
| 2017/0212698 A1 * | 7/2017 | Bhadauria | .......... | G06F 12/0888 |
| 2017/0308321 A1 * | 10/2017 | Kumagai | ............. | G06F 3/0649 |
| 2018/0082073 A1 * | 3/2018 | Trachy | ................ | G06F 11/1461 |
| 2018/0096045 A1 * | 4/2018 | Merriman | ............ | G06F 16/273 |

* cited by examiner

*Primary Examiner* — Tuan A Pham
(74) *Attorney, Agent, or Firm* — Van Pelt, Yi & James LLP

(57) ABSTRACT

A request associated with a data item is received. A data grouping corresponding to the data item is identified. The identified data grouping belongs to a data grouping container that has been assigned a plurality of data groupings. Any one data grouping of the plurality of data groupings is individually reassignable to a different data grouping container. At least one data center where the identified data grouping is stored among a plurality of data centers is determined. A processing of the request is managed based on the determined data center that stores the identified data grouping.

20 Claims, 7 Drawing Sheets

PROCESSING DATA GROUPINGS BELONGING TO DATA GROUPING CONTAINERS

BACKGROUND OF THE INVENTION

Data centers are facilities used to store computer systems and components, such as data storage systems and their associated components. Modern data centers are typically large facilities whose computer systems, notably data storage systems, are used to store large amounts of data associated with users located throughout the world. The tremendous increase in the generation and consumption of data in recent times has been a catalyst for the utilization of more and more data centers around the world to store these vast amounts of data. Concerns relating to user dissatisfaction and legal liability associated with the loss of data have motivated the use of redundant data storage systems and have further contributed to the proliferation of data and the data centers needed to store such data. Organizing, accessing, and processing the enormous amounts of data and their redundant copies throughout the world is challenging. Users demand fast access to data irrespective of where the users are located in the world and irrespective of which data centers in the world actually contain the desired data. Faster access is associated with data access requests originating in the data center where the desired data is located. However, the data centers from which data access requests originate can vary over time, even for data accessed on behalf of a unique user. A change in the requesting data center can arise because the user travels from one region to another or because service workload is shifted from a data center with high loads to another with lower loads in order to lower service request response latencies. Therefore, there exists a need for a way to more efficiently organize, access, and process user data that is capable of being stored in data centers across the world.

BRIEF DESCRIPTION OF THE DRAWINGS

Various embodiments of the invention are disclosed in the following detailed description and the accompanying drawings.

DETAILED DESCRIPTION

Figure 1:
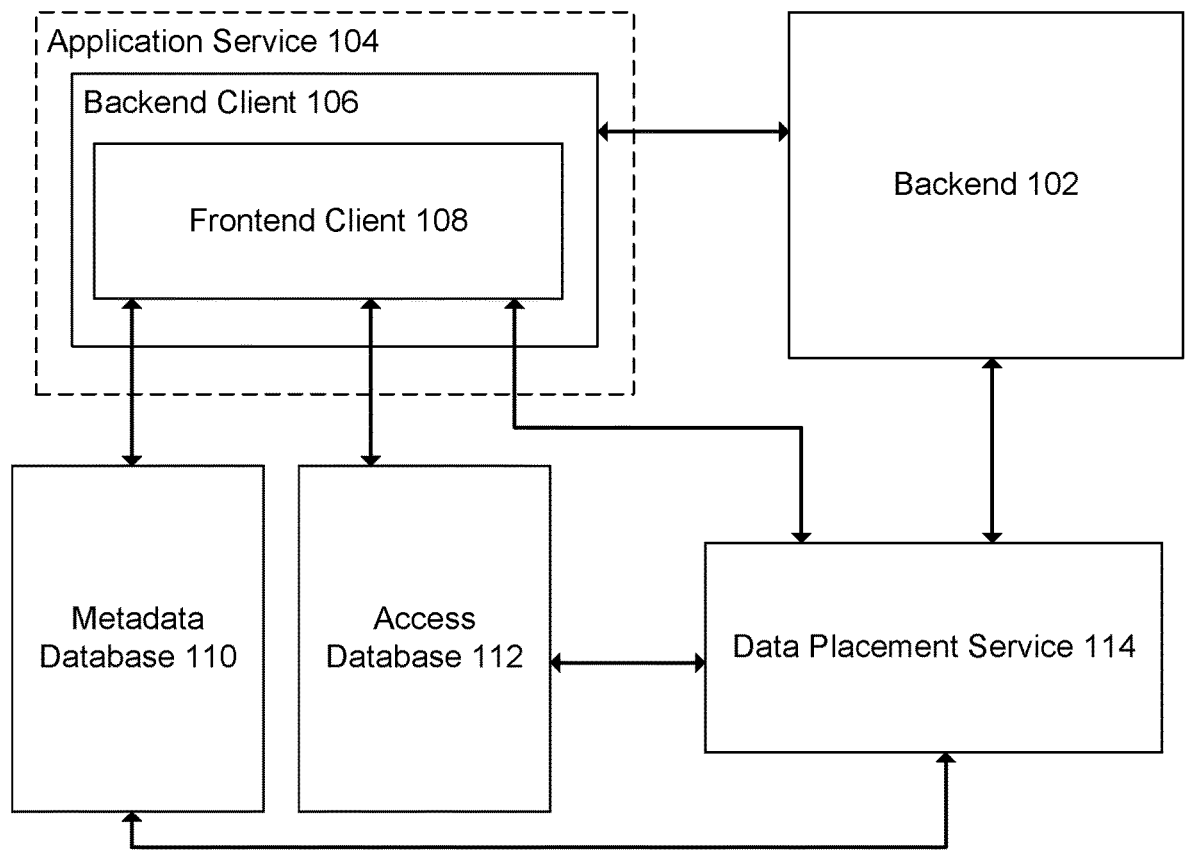
FIG. 1 is a block diagram illustrating an embodiment of a system for organizing and managing data groupings stored in data centers.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Organizing and managing data groupings stored in data centers is disclosed. In various embodiments, data that is being grouped and stored may include any type of data, including text, files, images, audio, video, computer instructions, and any other type of data. In some embodiments, data may be grouped at different levels of granularity. For example, at any particular data center, at a coarse level of granularity, data may be grouped in terms of relatively large data containers. In various embodiments, these containers are referred to as shards. Shards may be tens of gigabytes in size. Certain data management operations are more efficiently performed at the shard level of granularity. Examples of such operations include load balancing data across multiple data centers, recovering data after a machine failure, and other situations in which it may be appropriate to move relatively large amounts of data. Within shards, to facilitate operations that do not require movement of relatively large amounts of data, data may be further organized into smaller data groupings. These smaller groupings are referred to as µ-shards (micro shards). The µ-shards can contain one or more data items (e.g., one or more data files, data records, data entries, etc.) or a portion of a data item (e.g., a portion of a data file, a data record, a data entry, etc.). In some embodiments, each µ-shard is limited to be for only one user of a social networking service. For example, only data of a single user is allowed to be contained within a particular µ-shard. In various embodiments, µ-shards are flexible in terms of size and might be anywhere between a few hundred bytes to a few megabytes in size. These sizes may correspond to the size of a messaging conversation, an image, an audio clip, a video clip, or any other type of data relatively small in size compared to the size of a shard. A technical benefit of employing both a µ-shard level of granularity and a shard level of granularity is that the appropriate amount of data can be operated for efficiency purposes. For example, a µ-shard can be migrated to a location from which it is accessed frequently without needing to migrate the shard in which it is contained, thereby reducing latencies involved with accessing the μ-shard and conserving bandwidth by not needing to migrate the shard. Conversely, a shard can be migrated as a whole for load balancing purposes without needing to migrate the μ-shards it contains one at a time, thereby promoting efficiency for operations that require migration of relatively large amounts of data. In various embodiments, migration of data from a first location to a second location requires copying the data from the first location to the second location and removing the data from the first location.

In various embodiments, a request for data is received by a system that organizes and manages data groupings stored in data centers. The data that is being requested may be stored in a backend of a data center. For example, the backend is implemented as a collection of data storage systems in data centers, and any particular data grouping may be stored and replicated in any one of the data centers in the plurality of data centers. A request for data is typically received at a backend client that interfaces with the backend to request and retrieve data from the backend. In some embodiments, an additional frontend client may be embedded within the backend client. In various embodiments, the frontend client interfaces with the backend client to perform actions on data stored in the backend. The frontend client may also interface with other components associated with processing requests related to data stored in the backend. Examples include components associated with recording where in the backend particular data groupings are stored, recording frequencies with which and geographic locations from which particular data groupings have been accessed, and migrating data groupings within the backend.

In various embodiments, processing a request for data involves determining whether a mismatch exists between which data center has been used to access a data grouping and which data center the data grouping is stored in. If such a mismatch exists, then it might be appropriate to migrate the data grouping from the data center where it is stored to the data center that has been used to access the data grouping in order to reduce latencies associated with accessing the data grouping. In some embodiments, the data grouping that would be migrated is a μ-shard. In various embodiments, when migrating a data grouping from a first data center to a second data center in order to reduce access latencies, additional processing may occur to determine where within the second data center to place the data grouping. In some embodiments, this corresponds to determining which shard within a data center a μ-shard should be placed. In various embodiments, each μ-shard has a replica set of μ-shards such that each replica μ-shard is a backup of the original μ-shard. Thus, in these embodiments, when a μ-shard is migrated, the replica set of μ-shards must also be migrated. In various embodiments, determining which shard within a data center a μ-shard should be placed involves selecting a shard to migrate a μ-shard to that would minimize certain resources associated with migrating that μ-shard and migrating that μ-shard's replicas.

In some embodiments, a request for data may involve performing a compute (e.g., processing) on the data; however, the compute may be initiated in a data center that is not where the data, or at least a largest portion of the data, is stored. For example, when a request to process data is received for processing at one or more servers at one data center but storage local to this data center does not store the data of the request, the requested data must be obtained from storage of another data center. It may be appropriate to start pulling the data associated with the compute, determine in which data center the data is located, or at least a largest portion of the data is located, interrupt the compute, and then move the compute to the data center where the data is located rather than moving the data. In this manner, a system for organizing and managing data groupings stored in data centers can migrate computes as well as data groupings.

In various embodiments, a system for organizing and managing data groupings stored in data centers may organize and manage the sizes of relatively large data containers. For example, a shard may be managed so that its size does not exceed a certain threshold designed to ensure that shards are an appropriate size for operations such as load balancing. In some embodiments, managing shard size involves detecting when a first shard exceeds a certain threshold, provisioning a second shard, and migrating μ-shards from the first shard to the second shard until the first shard's size does not exceed the threshold. Just as μ-shards may have replica sets, shards may also have replica sets. If the first shard has a replica set of shards, then a replica set for the second shard may need to be provisioned, and μ-shards from the replica set for the first shard may need to be migrated to the replica set for the second shard.

FIG. 1 is a block diagram illustrating an embodiment of a system for organizing and managing data groupings stored in data centers. In the example shown, the system for organizing and managing data groupings stored in data centers includes backend 102, application service 104, metadata database 110, access database 112, and data placement service 114. Application service 104 includes backend client 106 and frontend client 108. In various embodiments, backend 102 is a database. Examples of backend 102 include any hardware or software system, component, process, and/or application associated with storing data. In some embodiments, backend 102 is a geo-distributed datastore system. Backend 102 may include a plurality of data centers located across the world (e.g. located in different countries). Furthermore, backend 102 may store data belonging to and accessed by users across the world. The data stored in backend 102 may include any type of data, including text, files, images, audio, video, computer instructions, and any other type of data. In various embodiments, backend 102 supports grouping data at a coarse level of granularity. For example, data may be stored in shards. In the example shown, backend client 106 of application service 104 interfaces with backend 102. For example, backend client 106 may receive and execute instructions to write data to backend 102 or read data from backend 102. Examples of backend client 106 include any hardware or software system, component, process, and/or application. In some embodiments, shards within backend 102 may be configured to have multiple replicas, with one designated to be the primary and the others referred to as secondaries. All the replicas of a shard may be referred to collectively as a shard replica set. The number of secondaries in a shard replica set and how a shard replica set is distributed across data centers can vary. For example, in some situations, it may be appropriate to require three replicas, with two replicas in one data center and a third in a different data center. In other situations, it may be appropriate to require three replicas located in three different data centers. In yet other situations, only one replica might be required because the infrastructure overhead of having multiple replicas is deemed too high relative to the value of the data.

In the example illustrated in FIG. 1, frontend client 108 is embedded within backend client 106 of application service 104. Examples of frontend client 108 include any hardware or software system, component, process, and/or application. In various embodiments, frontend client 108 contains additional control logic and/or instructions to allow for, in coordination with backend client 106, the organization and processing of data groupings stored in backend 102 that exist at a finer level of granularity than shards. For example, frontend client 108 may coordinate the organization and processing of μ-shards in backend 102. In various embodiments, μ-shard level granularity is not natively supported by backend client 106 for backend 102. In these embodiments, integration of a frontend client capable of working at a μ-shard level with a backend client that works at a shard level allows for data management operations at varying scales. For example, certain data management operations, such as load balancing data across multiple data centers and recovering data after a machine failure, are more efficiently handled at a shard level of granularity. As will be described herein, other types of data management operations can be more efficiently handled at a μ-shard level of granularity. In some embodiments, a request for data, e.g. a request for a particular μ-shard, stored in backend 102 can be directed to backend client 106, which can then interface with frontend client 108 as needed. In some embodiments, a request for data, e.g. a request for a particular μ-shard, stored in backend 102 can be directed to frontend client 106.

In the example illustrated in FIG. 1, frontend client 108 interfaces with metadata database 110, access database 112, and data placement service 114. Each of metadata database 110, access database 112, and data placement service 114 may be any hardware or software system, component, process, and/or application. In various embodiments, metadata database 110 is a location database used by frontend client 108 to look up the locations of μ-shards that have been requested. Metadata database 110 may store information on all ongoing μ-shard migrations, including locks to prevent multiple concurrent migrations of the same μ-shard. In some embodiments, each data center in backend 102 is configured to have a copy of metadata database 110 to ensure low read latencies and high availability. In addition, in some embodiments, metadata database 110 may be fronted by distributed caches at every data center to reduce the read load on the database. In various embodiments, metadata database 110 stores identifiers (IDs) for all μ-shards in backend 102. In some embodiments, a shard ID precisely specifying a shard in which a μ-shard is contained may be stored with each μ-shard ID. In other embodiments, a prefix portion of a shard ID may be stored and used with a μ-shard in a hashing scheme to allow for a determination of which shard the μ-shard is stored in. In various embodiments, access database 112 is an access counter database used by frontend client 108 to track all accesses to μ-shards so that proper μ-shard placement and migration decisions can be made. In some embodiments, each time a μ-shard is accessed, frontend client 108 requests that access database 112 record the access, the type of access, and the location from which the access was made. In some embodiments, each data center in backend 102 is configured to have a copy of access database 112. In various embodiments, each μ-shard has a counter associated with it in each data center. The counter may be configured to store access information for a specified number of days. For example, the counter could be configured to store access information for the preceding ten days, and frontend client 108 would be able to query data access patterns from the preceding ten days. In some embodiments, access database 112 can be integrated with metadata database 110. In the example shown, access database 112 is distinct from metadata database 110. Counting of μ-shard access can be performed independently of μ-shard location look up because counting of μ-shard access is typically performed asynchronously on a best-effort basis. In various embodiments, data placement service 114 is configured to determine where to place a μ-shard to minimize access latencies and reduce resource usage. In some embodiments, data placement service 114 is implemented as a distributed, stateless service with a presence in each data center in backend 102. In the example shown, data placement service 114 interfaces with metadata database 110 and access database 112. Data placement service 114 may request and receive μ-shard location information from metadata database 110 and request and receive μ-shard access information from access databased 112. Data placement service 114 may initiate and manage μ-shard migrations. In some embodiments, frontend client 108 may direct data placement service 114 to migrate a μ-shard. For example, frontend client 108 may notify to data placement service 114 that the placement of a μ-shard is suboptimal because data access requests for that μ-shard are being directed to a remote data center. Data placement service 114 might then look up the location of the μ-shard in metadata database 110, determine where that μ-shard has been accessed from by querying access database 112, and determine, according to a set of policies in place for μ-shard migration, where to migrate the μ-shard to. In some embodiments, data placement service 114 interfaces directly with backend 102 to manage μ-shards in backend 102. In some embodiments, data placement 114 coordinates with frontend client 108 to manage μ-shards in backend 102. In various embodiments, data placement service 114 also handles the provisioning of new μ-shards within backend 102 and determines where to initially place new μ-shards within backend 102.

In the example illustrated in FIG. 1, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. For example, backend 102 may be implemented as a geo-distributed datastore system containing a plurality of data centers located across the world, and additional instances of application service 104, metadata database 110, access database 112, and data placement service 114 may exist in various data centers across the world within backend 102. Application service 104, metadata database 110, access database 112, and data placement service 114 may be physically separate systems that are not necessarily located in the same geographic locations. Application service 104, metadata database 110, access database 112, data placement service 114, and other components not shown (e.g. applications or users requesting data stored in backend 102) may interface with each other over a network. Examples of a network include one or more of the following: a direct or indirect physical communication connection, mobile communication network, Internet, intranet, Local Area Network, Wide Area Network, Storage Area Network, and any other form of connecting two or more systems, components, or storage devices together. Components not shown in FIG. 1 may also exist.

Figure 2:
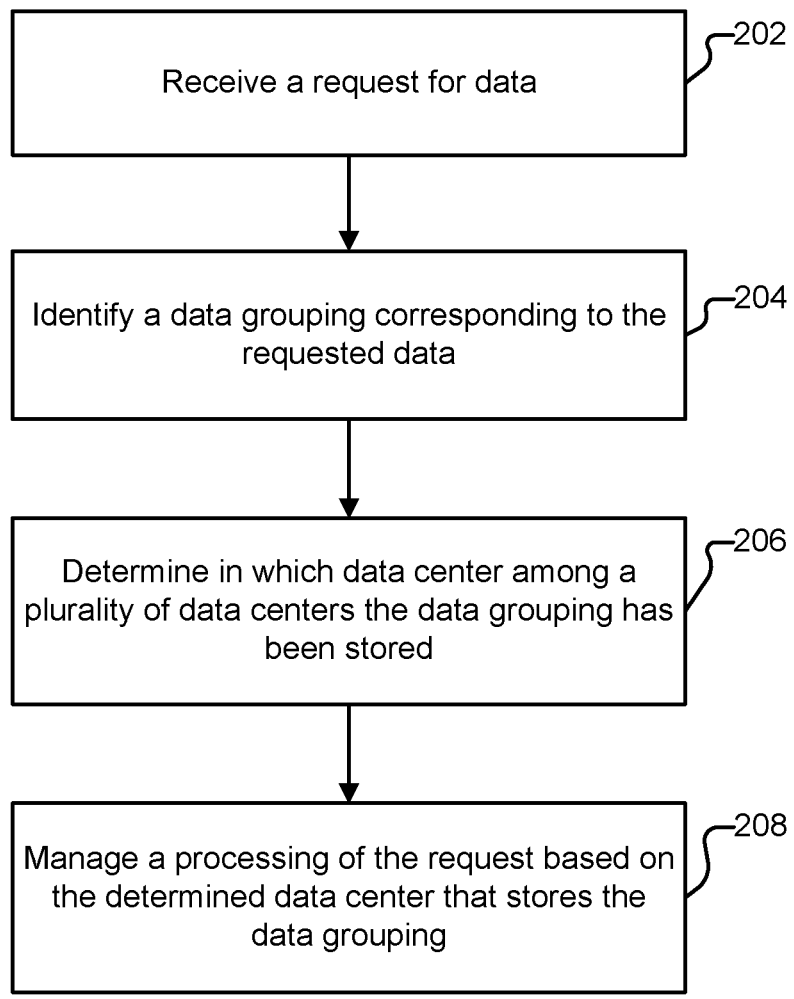
FIG. 2 is a flow chart illustrating an embodiment of a process for responding to a request for data.

FIG. 2 is a flow chart illustrating an embodiment of a process for responding to a request for data. In some embodiments, this process is implemented on application service 104, metadata database 110, access database 112, and data placement service 114 of FIG. 1.

At 202, a request for data is received. Examples of data that could be requested include text, files, images, audio, video, computer instructions, and any other type of data. In some embodiments, the request originates from a person located somewhere in the world. In some embodiments, the request is initiated by an application interfacing with application service 104 of FIG. 1. In various embodiments, the request is received by application service 104 of FIG. 1. The request may also be a request to data placement service 114 of FIG. 1 from application service 104 of FIG. 1 in which the request is relayed from an application interfacing with application service 104 of FIG. 1. The request may be associated with a particular piece of data in a particular data center. For example, the request could be to access a messaging conversation that is stored in a particular data center.

At 204, a data grouping corresponding to the requested data is identified. In some embodiments, the data grouping may belong to a data grouping container that has been assigned a plurality of data groupings, and any one data grouping of the plurality of data groupings is individually reassignable to a different data grouping container. For example, the requested data could be a messaging conversation, and the data grouping corresponding to the messaging conversation is a µ-shard. In various embodiments, the µ-shard would be contained in a shard where the shard has been assigned a plurality of µ-shards and each µ-shard in the shard is individually reassignable to different shards. In some embodiments, the µ-shard corresponding to the requested data is identified by frontend client 108 of FIG. 1.

At 206, it is determined in which data center among a plurality of data centers the data grouping has been stored. In some embodiments, the data grouping corresponding to the requested data is located by frontend client 108 of FIG. 1 querying metadata database 110 of FIG. 1 for the location of the data within backend 102 of FIG. 1. Backend 102 of FIG. 1 may be implemented as a geo-distributed datastore system, and thus may contain a plurality of data centers. If the location of the data grouping is determined, the data center in which the data grouping is stored would also be determined.

At 208, a processing of the request based on the determined data center that stores that data grouping is managed. In some embodiments, the request is to deliver the data to a requestor. For example, the request may be to deliver a messaging conversation to a user so that the user may view the messaging conversation. For this particular example, if the messaging conversation is stored in the same data center from which the request originated, then the messaging conversation does not need to be pulled from a remote data center in order to deliver the data to the user. The messaging conversation is optimally placed in this example. In some embodiments, the processing of the request involves migration of data when data is sub-optimally placed. For example, if it is determined that a µ-shard is sub-optimally placed and should be migrated to a data center where access requests for that µ-shard are frequently made, application service 104 of FIG. 1 may request data placement service 114 of FIG. 1 to migrate the µ-shard to a data center where access requests for that µ-shard are frequently made. In this scenario, data placement service 114 of FIG. 1 may query access database 112 of FIG. 1 to determine which data centers have made accesses to the µ-shard and the frequencies of those accesses. Data placement service 114 of FIG. 1 could then determine the µ-shard's location (and thus which data center stores that µ-shard) by querying metadata database 110 of FIG. 1 and coordinate a migration of the µ-shard to a data center where access requests for that µ-shard are frequently made.

Figure 3:
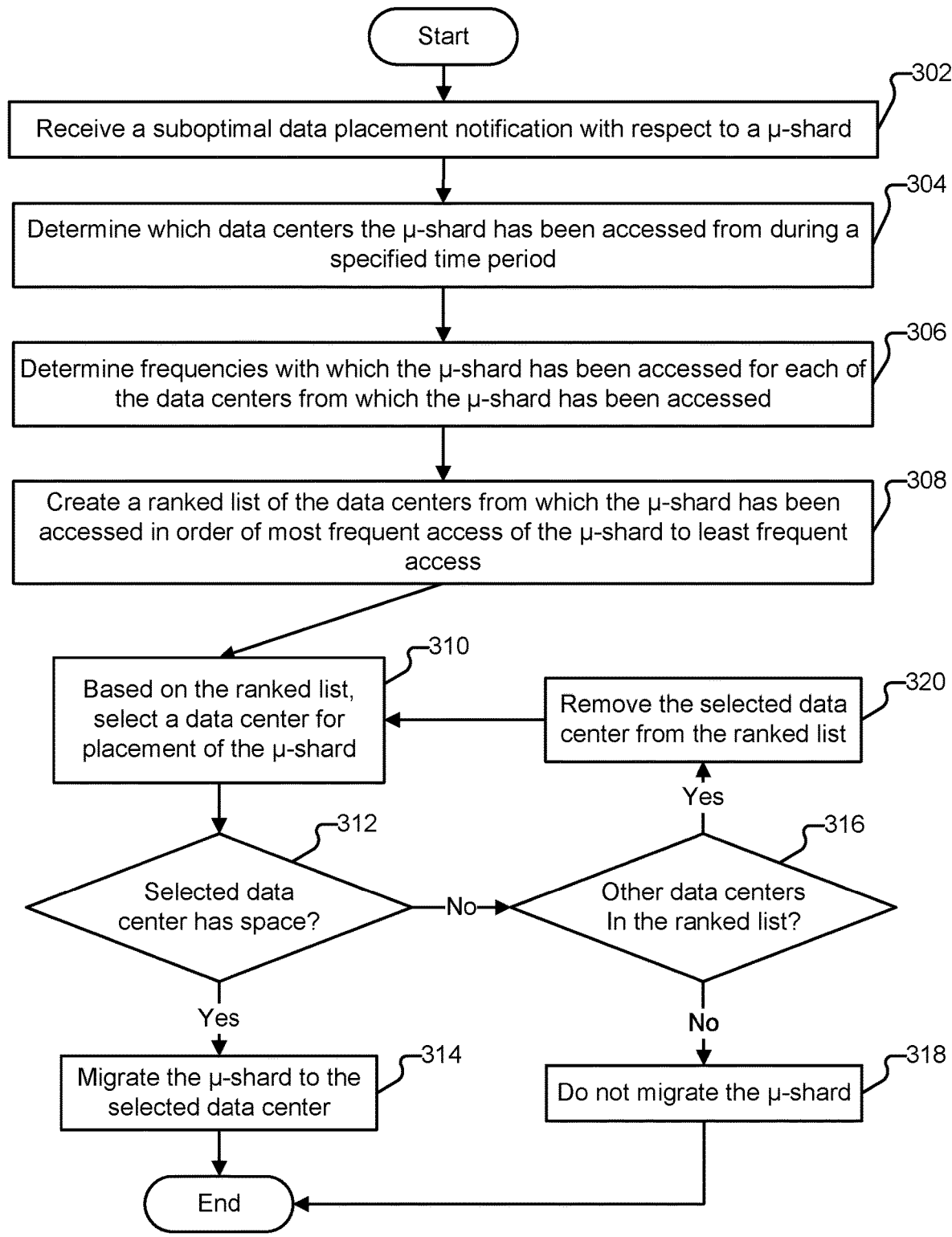
FIG. 3 is a flow chart illustrating an embodiment of a process for migrating a data grouping.

FIG. 3 is a flow chart illustrating an embodiment of a process for migrating a data grouping. In some embodiments, the process of FIG. 3 is implemented in data placement service 114 of FIG. 1. In various embodiments, the data grouping to be migrated is a µ-shard.

At 302, a notification of a suboptimal data placement with respect to a µ-shard is received. In some embodiments, the notification of the suboptimal placement is sent to data placement service 114 of FIG. 1 by frontend client 108 of FIG. 1. In some embodiments, a notification of a suboptimal data placement is triggered if a µ-shard is accessed from a data center that does not have a local copy of the µ-shard. Such a notification may be sent to data placement service 114 of FIG. 1 to reevaluate the placement of the µ-shard. The notification may be sent during or after the µ-shard for which there is no local copy is pulled from a remote data center, and the reevaluation of the µ-shard's placement may be performed after the µ-shard is accessed. In this manner, access of the µ-shard does not need to be interrupted in order to reevaluate its placement.

At 304, which data centers the µ-shard has been accessed from during a specified time period is determined. In various embodiments, data placement service 114 of FIG. 1 queries access database 112 of FIG. 1 to determine which data centers have requested access to the µ-shard.

At 306, the frequencies with which the µ-shard has been accessed for each of the data centers from which the µ-shard has been accessed are determined. In various embodiments, data placement service 114 of FIG. 1 determines this information by querying access database 112 of FIG. 1. In addition to storing information associated with which data centers have accessed a µ-shard, access database 112 of FIG. 1 can also report the frequencies of those accesses if a counter is associated with each µ-shard.

At 308, a ranked list of the data centers from which the µ-shard has been accessed in order of most frequent access of the µ-shard to least frequent access is created. In some embodiments, other factors may be considered in determining the rankings for the data centers in the ranked list. For example, load balancing may be considered. If a particular data center from which the µ-shard has been accessed is overcrowded, the extent to which that particular data center is overcrowded may be considered in generating a ranking for that particular data center. In some embodiments, data center overcrowding may be considered after a ranked list based on frequency of access is created, as is shown in step 312. In some embodiments, the ranked list is not permitted to exceed a certain length. For example, the ranked list may limit data center candidates for µ-shard placement to three top choices.

At 310, based on the ranked list, a data center for placement of the µ-shard is selected. When step 310 is executed after step 308, the selected data center would be the data center at the top of the ranked list.

At 312, it is determined whether the selected data center has space for placement of the µ-shard. In some embodiments, a data center will be considered to not have space if it is nearing capacity, overcrowded compared to other data centers, and/or generally not available or otherwise suitable for placement of the µ-shard. If at 312 it is determined that the selected data center has space, at 314, the µ-shard is migrated to the selected data center. In various embodiments, data placement service 114 of FIG. 1 will first determine if a µ-shard is currently being accessed and/or modified before attempting to migrate the µ-shard. If the µ-shard is not currently being accessed and/or modified, data placement service 114 of FIG. 1 would lock the µ-shard to prevent its modification during migration and then either coordinate with application service 104 of FIG. 1 to migrate or directly migrate the µ-shard within backend 102 of FIG. 1. After the migration is complete, the lock on the µ-shard would be released. In some embodiments, data placement service 114 of FIG. 1 has a migration policy that specifies a limit on the number of migrations that are permitted for a µ-shard in a specified period of time. For example, the migration policy may specify that a µ-shard may only be migrated once in a six-hour period. Such a policy may be implemented to conserve resources, such as cross-data center bandwidth, associated with migration of µ-shards. In various embodiments, in addition to determining which data center to migrate a µ-shard to, the shard in that data center that will store the µ-shard must also be determined. An embodiment of a process for this determination is illustrated in FIG. 4 and detailed in the description associated with FIG. 4.

If at 312 it is determined that the selected data center does not have space for placement of the µ-shard, at 316, it is determined whether there are other data centers in the ranked list of data centers, i.e. whether there are other data center candidates for placement of the µ-shard. If at 316 it is determined that there are no other data centers in the ranked list, at 318, it is determined that the µ-shard should not be migrated. In some embodiments, an attempt to migrate the µ-shard can be made at a later time. If at 316 it is determined that there is at least one other data center in the ranked list, at 320, the currently selected data center is removed from the ranked list. Step 310 is then repeated with the updated ranked list of data center candidates for placement of the µ-shard.

Figure 4:
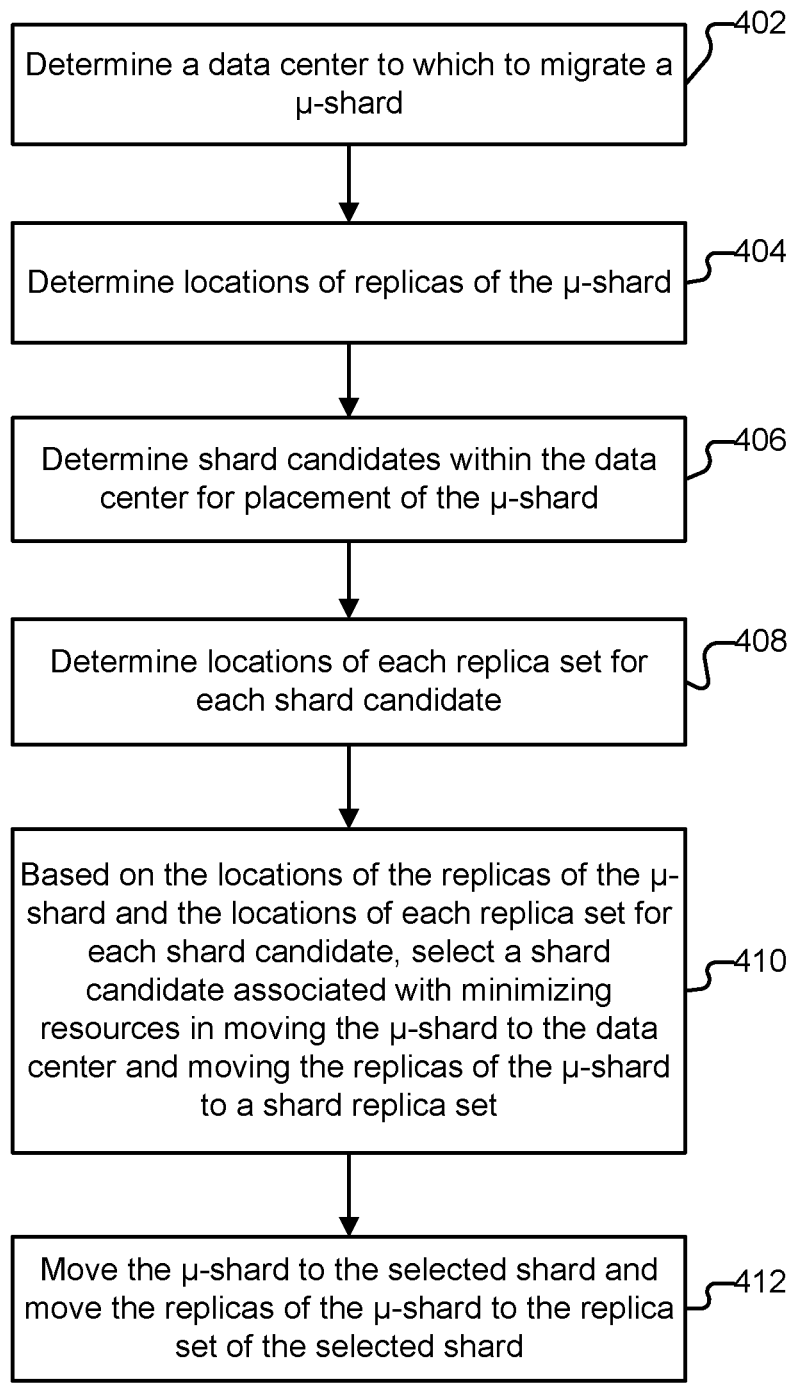
FIG. 4 is a flow chart illustrating an embodiment of a process for determining a data grouping container to store a data grouping.

FIG. 4 is a flow chart illustrating an embodiment of a process for determining a data grouping container to store a data grouping. In some embodiments, this corresponds to determining which shard should store a µ-shard that has been migrated. In some embodiments, the process of FIG. 4 is implemented in data placement service 114 of FIG. 1.

At 402, a data center to which to migrate a µ-shard is determined. In some embodiments, a µ-shard is migrated from a first data center to a second data center because the µ-shard was sub-optimally located in the first data center. An embodiment of a process for migrating a µ-shard due to its suboptimal placement is illustrated in FIG. 3 and detailed in the description associated with FIG. 3.

At 404, locations of replicas of the µ-shard are determined. In various embodiments, each µ-shard has a replica set of µ-shards where each replica µ-shard is a backup of the µ-shard. The replicas of the µ-shard may be stored in data centers different from the data center where the µ-shard is stored. In various embodiments, each replica of a µ-shard is stored in a replica of the shard that stores that µ-shard. When a µ-shard is migrated, replicas of that µ-shard also need to be migrated to maintain consistent µ-shard to shard mapping. In various embodiments, data placement service 114 of FIG. 1 determines the locations of replicas of the µ-shard by querying metadata database 110 of FIG. 1.

At 406, shard candidates within the data center for placement of the µ-shard are determined. In various embodiments, the shard candidates are the shards within the data center where placement of the µ-shard is possible. For example, these may be the shards that have space for placement of the µ-shard.

At 408, locations of each replica set for each shard candidate are determined. Just as a µ-shard may have replicas, a shard may also have replicas. In various embodiments, data placement service 114 of FIG. 1 determines the locations of shards and their replicas by querying frontend client 108 of FIG. 1. Frontend client 108 of FIG. 1 may look up locations of shards and their replicas by interfacing with backend client 106 of FIG. 1, which typically has knowledge of data grouping containers, such as shards, that it natively supports.

At 410, based on the locations of the replicas of the µ-shard and the locations of each replica set for each shard candidate, a shard candidate associated with minimizing resources in moving the µ-shard to the data center and moving the replicas of the µ-shard to a shard replica set is selected. A resource to be conserved may be cross-data center bandwidth. An example of step 410 is illustrated in FIG. 5 and detailed in the description associated with FIG. 5.

At 412, the µ-shard is moved to the selected shard, and the replicas of the µ-shard are moved to the replica set of the selected shard.

Figure 5:
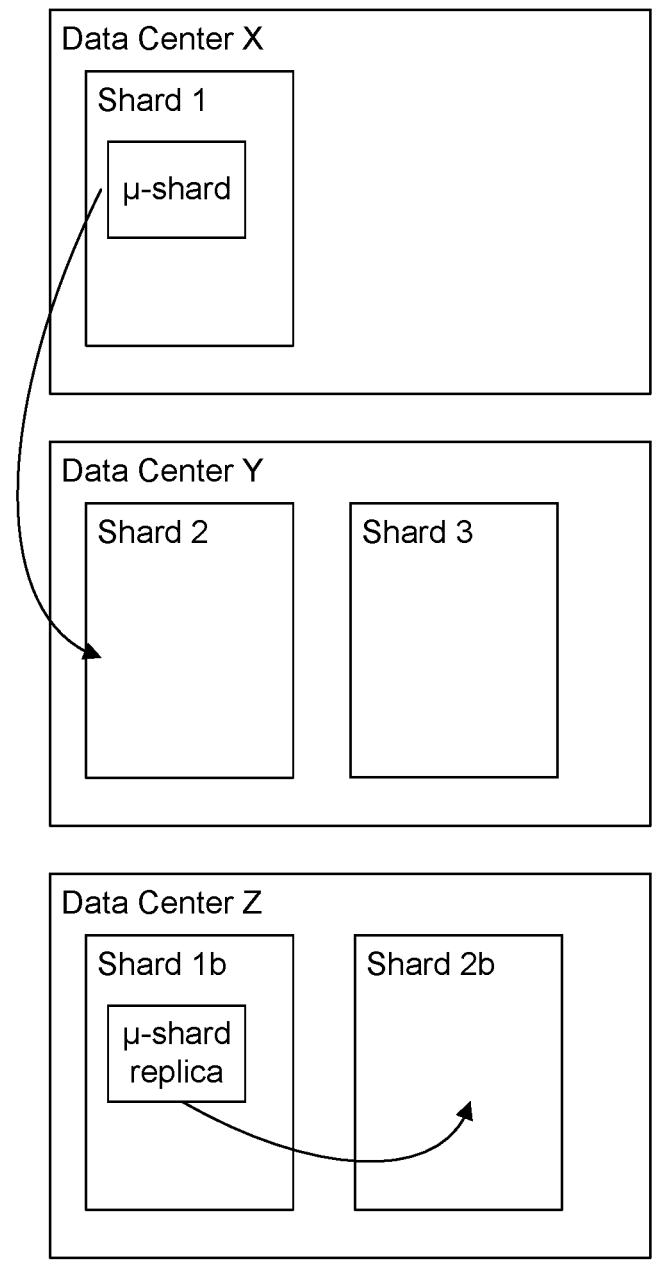
FIG. 5 is a diagram illustrating an example of an embodiment detailed in the description associated with FIG. 4.

FIG. 5 is a diagram illustrating an example of an embodiment detailed in the description associated with FIG. 4. As illustrated in FIG. 5, suppose a µ-shard stored in shard 1 of data center X is to be migrated to data center Y. Furthermore, suppose that shards 2 and 3 within data center Y are candidates for placement of the µ-shard. To determine which shard (shard 2 or shard 3) within data center Y to place the µ-shard, the locations of the replicas of the µ-shard and the locations of the replicas of shard 2 and shard 3 are considered. Suppose, as illustrated in FIG. 5, that the µ-shard has a single replica stored in shard 1*b* of data center Z (where shard 1*b* is a replica of shard 1). Also suppose that data center Z has a replica of shard 2 (i.e., there is a shard 2*b* in data center Z) but not a replica of shard 3 (i.e., there is no shard 3*b* in data center Z; shard 3*b* could be located in some other data center that is not shown in FIG. 5). In this scenario, cross-data center bandwidth would be conserved by migrating the µ-shard to shard 2 in data center Y because the replica of the µ-shard can be moved internally from shard 1*b* of data center Z to shard 2*b* of data center Z without using cross-data center bandwidth. Moving the µ-shard to shard 3 would not be as effective in terms of conserving cross-data center bandwidth because the replica of the µ-shard would need to be moved from shard 1*b* of data center Z to some other data center where shard 3*b* is located in order to store the replica of the µ-shard in a replica of the shard storing the µ-shard.

The embodiments illustrated in FIGS. 3, 4, and 5 are examples of data being moved (e.g., to where the data is requested). In some embodiments, it is more efficient to move a compute instead of data because such an operation eliminates the need to copy and/or move the data. This may be the case if the volume of data on which a compute is performed is large but the results of the compute returned to the requestor of the compute are relatively small in terms of storage size. For example, if a compute requested on a local data center is processing of a large video file stored in a remote data center and the result of the compute is an extraction of some parameter related to the video file, significantly more cross-data center bandwidth and significantly higher latency might be incurred to move the video file to the local data center to perform the compute than to move the compute to where the video file is stored and return the result of the compute to the local data center.

Figure 6:
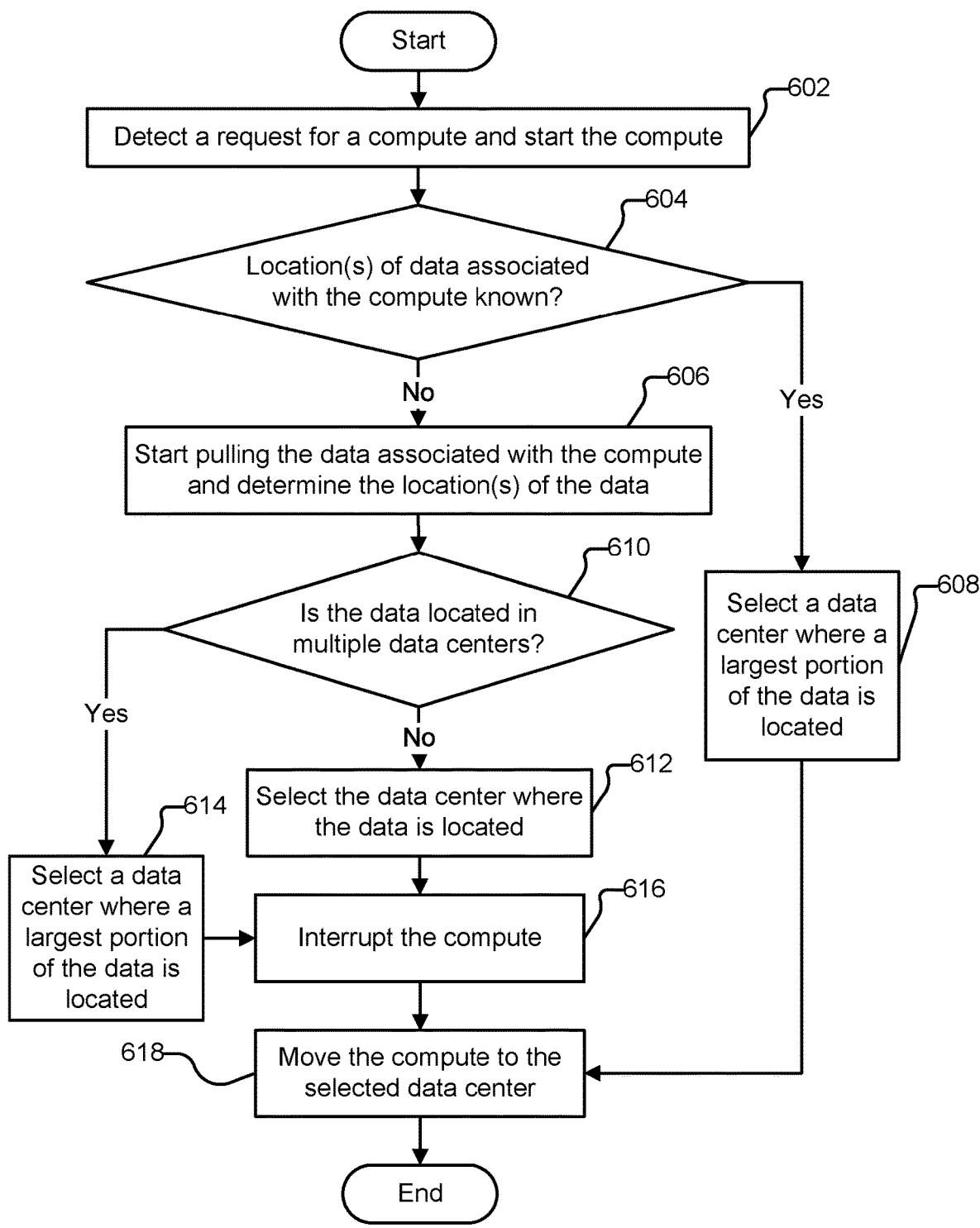
FIG. 6 is a flow chart illustrating an embodiment of a process for moving a compute closer to data on which the compute is performed.

FIG. 6 is a flow chart illustrating an embodiment of a process for moving a compute closer to data on which the compute is performed. In some embodiments, the process of FIG. 6 is implemented in several of the components of FIG. 1.

At 602, a request for a compute (e.g., data processing) is detected, and the compute is started. In various embodiments, the compute is a processing of data stored in backend 102 of FIG. 1, which may be implemented as a plurality of data centers. The request for the compute may be delivered to backend client 106 of FIG. 1, after which backend client 106 starts the compute. In some embodiments, backend client 106 of FIG. 1 contains applications that operate on data stored in backend 102 of FIG. 1. For example, backend client 106 of FIG. 1 may contain an application that re-encodes video data stored in backend 102 of FIG. 1.

At 604, it is determined whether the location (or locations if no single location stores an entire copy of the data) of the data associated with the compute is known. In various embodiments, this location information may not be known by the application performing the compute before the compute is started. For example, the application performing the compute may only possess a task ID associated with the compute derived from a task scheduler and would only be able to obtain location information after the task ID is submitted and the task associated with the task ID begins to pass the data to the application performing the compute. In some situations, a task scheduler possesses information regarding data dependencies and is able to share data location information with the application performing the compute before the compute is started. If at 604 it is determined that the location of the data associated with the compute is not known, at 606, data associated with the compute will start to be pulled and the location of the data will be determined from the data itself. For example, metadata associated with the data could indicate where the data is stored. In various embodiments, backend client 106 of FIG. 1 may coordinate with frontend client 108 of FIG. 1 to determine the location of the data. Frontend client 108 of FIG. 1 may query metadata database 110 of FIG. 1 to determine the location of the data.

If at 604 it is determined that the location of the data associated with the compute is known, at 608, a data center where a largest portion of the data is located is selected. If all of the data is stored in one data center, then one data center will be selected. If no single data center stores an entire copy of the data, then the data center where a largest portion of the data is located will be selected. For example, if video data is broken up into pieces and is located in three different data centers, then the data center containing the largest piece of the video data will be selected.

At 610, in the scenario where the compute starts before a data center is selected, it is determined whether the data is located in multiple data centers. If at 610 it is determined that the data is located in a single data center, at 612, the data center where the data is located is selected. If it is determined at 610 that the data is located in multiple data centers, at 614, a data center where a largest portion of the data is located is selected.

At 616, the compute is interrupted. At this point, the location of the data, or at least the location of the largest portion of the data, is known and the compute can be moved to that location. In moving the compute, a technical benefit is that the data does not need to be copied to where the compute started, thereby reducing delays associated with copying the data and conserving cross-data center bandwidth. Interrupting the compute may include abandoning compute (e.g., abandoning data processing) at the data center that initially received/performed the compute.

At 618, the compute is moved to the selected data center. In various embodiments, the application performing the compute has a presence in each data center in backend 102 of FIG. 1. Each data center may have a copy of the application performing the compute. The compute may be moved by instructing the copy of the application in the selected data center to perform the compute. The compute may be restarted from the beginning in the selected data center or information associated with how to continue the compute from the point at which it was interrupted may be communicated to the selected data center. In some embodiments, the compute itself may be migrated to the selected data center. In some embodiments, the compute and the computer instructions comprising the compute are among the types of data that can be migrated by data placement service 114 of FIG. 1.

Figure 7:
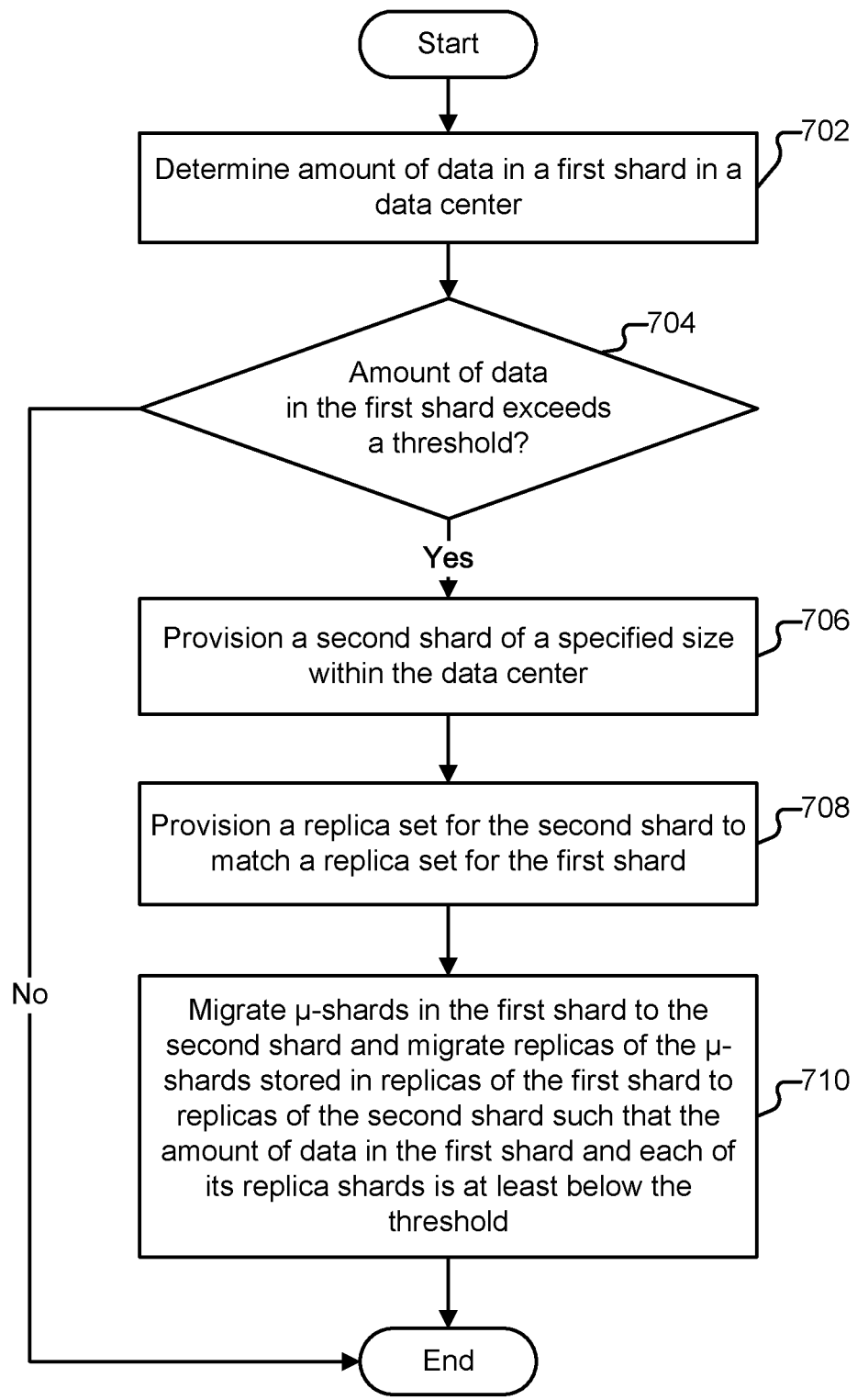
FIG. 7 is a flow chart illustrating an embodiment of a process for moving data at a data grouping container level of granularity.

FIG. 7 is a flow chart illustrating an embodiment of a process for moving data at a data grouping container level of granularity. In some embodiments, shards that contain μ-shards are the data grouping containers that are moved. In some embodiments, the process of FIG. 7 is implemented in several of the components of FIG. 1.

At 702, the amount of data stored in a first shard in a data center is determined. In some embodiments, the amount of data stored in each shard is monitored, new shards are created, and data is migrated between shards such that individual shards do not exceed a specified size limit. Shard size may need to be limited because certain data processing operations are more efficient when performed on data sizes in a certain range. For example, shard sizes of approximately 20 gigabytes may be appropriate for migrating shards for load balancing. In some embodiments, data placement service 114 of FIG. 1 coordinates with application service 104 of FIG. 1 to monitor shard sizes.

At 704, it is determined whether the amount of data in the first shard exceeds a certain threshold. For example, if an appropriate size for shards in some embodiment is known to be 20 gigabytes, a threshold of 20 gigabytes may be set, and upon a shard exceeding 20 gigabytes in size, an action is taken to move data contained in the shard. In this example, a threshold lower than 20 gigabytes could be set so that an action can be taken before the shard size reaches 20 gigabytes. In addition, a threshold higher than 20 gigabytes could be set to reduce the number of times shard data is moved. If at 704 it is determined that the amount of data in the first shard does not exceed the threshold, then no further action is taken.

If at 704 it is determined that the amount of data in the first shard exceeds the threshold, at 706, a second shard of a specified size within the data center in which the first shard resides is provisioned. In some embodiments, data placement service 114 of FIG. 1 coordinates with application service 104 of FIG. 1 to provision new shards.

At 708, a replica set for the second shard to match a replica set for the first shard is provisioned. In various embodiments, shards within backend 102 of FIG. 1 may be configured to have multiple replicas. If the data in a first shard requires a certain number of backup copies, then when data from the first shard is moved to a second shard, it may be appropriate to have the same number of backup copies for the moved data, which would necessitate provisioning a replica set for the second shard to match the replica set of the first shard. In some embodiments, it may not be necessary to provision as many replicas of the second shard as exist for the first shard. For example, if the data being moved to the second shard is deemed to be of low value, it may be appropriate to have fewer replicas. The replicas of the first shard may be located in data centers different from where the first shard is located. In some embodiments, replicas of the second shard are provisioned in data centers corresponding to where the replicas of the first shard are located.

At 710, μ-shards in the first shard are migrated to the second shard, and replicas of the μ-shards stored in replicas of the first shard are migrated to replicas of the second shard such that the amount of data in the first shard and each of its replica shards is at least below the threshold. In some embodiments, data placement service 114 of FIG. 1 coordinates with application service 104 of FIG. 1 to provision new shards. Data placement service 114 of FIG. 1 may query metadata database 110 of FIG. 1 for the locations of μ-shards to be moved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request associated with a data item;
   identifying a data grouping corresponding to the data item, wherein the identified data grouping belongs to a data grouping container replicated across a set of data centers at different facilities, the data grouping container has been assigned a plurality of data groupings, and any one data grouping of the plurality of data groupings is individually reassignable to a different data grouping container replicated across a different set of data centers;
   determining at least one data center where the identified data grouping is stored among a plurality of data centers; and
   managing a processing of the request based on the determined data center that stores the identified data grouping including by:
      in response to a determination that the request is received at a data center not currently storing the data grouping container of the data item, analyzing a data access pattern for the data item across each of the plurality of data centers at different facilities to determine a ranked list of the plurality of data centers;
      selecting a target data center based on the ranked list and identifying a migration target data grouping container of the selected target data center, wherein the selected target data center of the migration target data grouping container is different from the data center that received the request triggering the analyzing of the data access pattern but is not currently storing the data grouping container of the data item;
      determining whether an amount of data in the data grouping container of the identified data grouping exceeds a threshold size; and
      in response to a determination that the amount of data in the data grouping container of the identified data grouping exceeds the threshold size, migrating the identified data grouping from its assigned data grouping container to the migration target data grouping container of the selected target data center identified based on the analysis of the data access pattern for the data item across each of the plurality of data centers at the different facilities.

2. The method of claim 1, wherein the identified data grouping includes a plurality of data items.

3. The method of claim 1, wherein frequencies of accesses to the identified data grouping from each of the plurality of data centers are tracked.

4. The method of claim 1, wherein the migration target grouping container has been identified based at least in part on an identification of data centers where the migration target data grouping container has been replicated.

5. The method of claim 1, wherein the migration target data grouping container has been identified based at least in part on a determination that the migration target data grouping container has been replicated in the determined data center for the identified data grouping.

6. The method of claim 1, wherein the migration target data grouping container has been identified based at least in part on an analysis of an amount of data movements across different data centers required to replicate the identified data grouping across all replicas of the migration target data grouping container.

7. The method of claim 1, wherein managing the processing of the request includes determining whether not to migrate the identified data grouping based on a migration policy that limits a number of migrations that are permitted within a specified period of time.

8. The method of claim 1, wherein the received request is a compute request.

9. The method of claim 8, wherein managing the processing of the request includes assigning the compute request to the determined data center based on an identification of the data item for the compute request.

10. The method of claim 1, wherein managing the processing of the request includes reassigning the request received at an initial data center to the determined data center.

11. The method of claim 1, wherein managing the processing of the request includes performing at least a portion of the request at an initial data center and abandoning the request at the initial data center based on the determination of the data center where the identified data grouping is stored.

12. The method of claim 1, wherein migrating the identified data grouping to the migration target data grouping container includes replicating the identified data grouping to a plurality of replicas of the particular migration target data grouping container.

13. The method of claim 1, wherein migrating the identified data grouping to the migration target data grouping container includes provisioning the particular migration target data grouping container.

14. The method of claim 1, wherein the identified data grouping is a μ-shard, the data grouping container of the identified data grouping is a shard, and the μ-shard has been assigned to the shard.

15. A system, comprising:
   a processor configured to:
      receive a request associated with a data item;
      identify a data grouping corresponding to the data item, wherein the identified data grouping belongs to a data grouping container replicated across a set of data centers at different facilities, the data grouping container has been assigned a plurality of data groupings, and any one data grouping of the plurality of data groupings is individually reassignable to a different data grouping container replicated across a different set of data centers;

determine at least one data center where the identified data grouping is stored among a plurality of data centers; and manage a processing of the request based on the determined data center that stores the identified data grouping including by being configured to:

in response to a determination that the request is received at a data center not currently storing the data grouping container of the data item, analyze a data access pattern for the data item across each of the plurality of data centers at different facilities to determine a ranked list of the plurality of data centers;

select a target data center based on the ranked list and identify a migration target data grouping container of the selected target data center, wherein the selected target data center of the migration target data grouping container is different from the data center that received the request triggering the analyzing of the data access pattern but is not currently storing the data grouping container of the data item;

determine whether an amount of data in the data grouping container of the identified data grouping exceeds a threshold size; and in response to a determination that the amount of data in the data grouping container of the identified data grouping exceeds the threshold size, migrate the identified data grouping from its assigned data grouping container to the migration target data grouping container of the selected target data center identified based on the analysis of the data access pattern for the data item across each of the plurality of data centers at the different facilities; and a memory coupled to the processor and configured to provide the processor with instructions.

16. The system of claim 15, wherein the migration target grouping container has been identified based at least in part on an identification of data centers where the migration target data grouping container has been replicated.

17. The system of claim 15, wherein the migration target data grouping container has been identified based at least in part on a determination that the migration target data grouping container has been replicated in the determined data center for the identified data grouping.

18. The system of claim 15, wherein the migration target data grouping container has been identified based at least in part on an analysis of an amount of data movements across different data centers required to replicate the identified data grouping across all replicas of the migration target data grouping container.

19. The system of claim 15, wherein managing the processing of the request includes reassigning the request received at an initial data center to the determined data center.

20. A computer program product, the computer program product being embodied in a non-transitory computer readable storage medium and comprising computer instructions for:

receiving a request associated with a data item;

identifying a data grouping corresponding to the data item, wherein the identified data grouping belongs to a data grouping container replicated across a set of data centers at different facilities, the data grouping container has been assigned a plurality of data groupings, and any one data grouping of the plurality of data groupings is individually reassignable to a different data grouping container replicated across a different set of data centers;

determining at least one data center where the identified data grouping is stored among a plurality of data centers; and managing a processing of the request based on the determined data center that stores the identified data grouping including by:

in response to a determination that the request is received at a data center not currently storing the data grouping container of the data item, analyzing a data access pattern for the data item across each of the plurality of data centers at different facilities to determine a ranked list of the plurality of data centers;

selecting a target data center based on the ranked list and identifying a migration target data grouping container of the selected target data center, wherein the selected target data center of the migration target data grouping container is different from the data center that received the request triggering the analyzing of the data access pattern but is not currently storing the data grouping container of the data item;

determining whether an amount of data in the data grouping container of the identified data grouping exceeds a threshold size; and in response to a determination that the amount of data in the data grouping container of the identified data grouping exceeds the threshold size, migrating the identified data grouping from its assigned data grouping container to the migration target data grouping container of the selected target data center identified based on the analysis of the data access pattern for the data item across each of the plurality of data centers at the different facilities.

* * * * *